United States Patent
Chou et al.

(10) Patent No.: US 9,479,365 B2
(45) Date of Patent: Oct. 25, 2016

(54) METHOD FOR PERFORMING LOOP UNROLLED DECISION FEEDBACK EQUALIZATION IN AN ELECTRONIC DEVICE WITH AID OF VOLTAGE FEEDFORWARD, AND ASSOCIATED APPARATUS

(71) Applicant: MEDIATEK INC., Hsin-Chu (TW)

(72) Inventors: Tsung-Hsin Chou, Nantou County (TW); Chih-Hsien Lin, Hsinchu County (TW); Huai-Te Wang, Taoyuan (TW); Bo-Jiun Chen, New Taipei (TW); Yan-Bin Luo, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/737,513

(22) Filed: Jun. 12, 2015

(65) Prior Publication Data

US 2016/0065397 A1    Mar. 3, 2016

Related U.S. Application Data

(60) Provisional application No. 62/042,881, filed on Aug. 28, 2014.

(51) Int. Cl.
*H03H 7/30* (2006.01)
*H04L 25/03* (2006.01)

(52) U.S. Cl.
CPC ... *H04L 25/03057* (2013.01); *H04L 25/03885* (2013.01); *H04L 2025/0349* (2013.01); *H04L 2025/03484* (2013.01); *H04L 2025/03777* (2013.01); *H04L 2025/03808* (2013.01)

(58) Field of Classification Search
CPC ............... H04L 25/3038; H04L 25/03057; H04B 3/32

USPC ......................... 375/233, 285, 232, 229, 230
See application file for complete search history.

(56) References Cited

U.S. PATENT DOCUMENTS

| 8,861,667 B1 * | 10/2014 | Zerbe et al. .................. 375/371 |
| 8,966,353 B2 * | 2/2015 | Zhou et al. .................. 714/799 |
| 2006/0233291 A1 * | 10/2006 | Garlepp et al. ............... 375/355 |

(Continued)

OTHER PUBLICATIONS

John F. Bulzacchelli et al., "A 10-Gb/s 5-Tap DFE/4-Tap FFE Transceiver in 90-nm CMOS Technology", Dec. 2006, pp. 2885-2900, vol. 41, No. 12, IEEE Journal of Solid-State Circuits.

*Primary Examiner* — Helene Tayong
(74) *Attorney, Agent, or Firm* — Winston Hsu; Scott Margo

(57) ABSTRACT

A method for performing loop unrolled decision feedback equalization (DFE) and an associated apparatus are provided. The method includes: receiving a tap control signal and an offset control signal from a digital domain of a DFE receiver in an electronic device, and generating DFE information respectively corresponding to the tap control signal and the offset control signal in an analog domain of the DFE receiver; broadcasting the DFE information respectively corresponding to the tap control signal and the offset control signal toward comparators in the DFE receiver; utilizing the comparators to perform comparison operations according to the DFE information respectively corresponding to the tap control signal and the offset control signal to generate comparison results; and selectively adjusting the tap control signal and the offset control signal according to the comparison results, to optimize the DFE information respectively corresponding to the tap control signal and the offset control signal, respectively.

17 Claims, 7 Drawing Sheets

(56) References Cited

U.S. PATENT DOCUMENTS

| | | |
|---|---|---|
| 2008/0049825 A1 | 2/2008 | Chen |
| 2012/0201289 A1 | 8/2012 | Abdalla |
| 2012/0300831 A1* | 11/2012 | Luo et al. .................... 375/233 |
| 2013/0243070 A1 | 9/2013 | Ito |

* cited by examiner

METHOD FOR PERFORMING LOOP UNROLLED DECISION FEEDBACK EQUALIZATION IN AN ELECTRONIC DEVICE WITH AID OF VOLTAGE FEEDFORWARD, AND ASSOCIATED APPARATUS

CROSS REFERENCE TO RELATED APPLICATIONS

This application claims the benefit of U.S. Provisional Application No. 62/042,881, which was filed on Aug. 28, 2014, and is included herein by reference.

BACKGROUND

The present invention relates to transferring accurate equalization information to comparators within a receiver, and more particularly, to a method for performing loop unrolled decision feedback equalization (DFE) in an electronic device, and an associated apparatus.

According to the related art, in order to overcome the inter symbol interference (ISI) caused by channel loss, a conventional receiver of a conventional system is typically implemented in a manner of changing the sampling threshold to increase the signal-to-noise ratio (SNR). For example, by adopting a speculative DFE structure, the conventional receiver may sample data with different thresholds (e.g. thresholds LEV_H or LEV_L) at different time points to compensate 1st post cursor (or TAP1) based on previous data. However, some problems may occur. For example, the conventional receiver may erroneously reproduce data when receiving a signal. In another example, the conventional receiver may easily fail to recover data in a situation where heavy ISI is encountered, which may degrade the overall performance of the whole conventional system. Thus, a novel method and a corresponding architecture are required to improve the data recovery capability of a DFE receiver in a system, in order to guarantee the overall performance of the whole system.

SUMMARY

It is an objective of the claimed invention to provide a method for performing loop unrolled decision feedback equalization (DFE) in an electronic device, and an associated apparatus, in order to solve the above-mentioned problems.

It is another objective of the claimed invention to provide a method for performing loop unrolled decision feedback equalization in an electronic device, and an associated apparatus, in order to automatically adjust equalization information input into comparators within a receiver such as a DFE receiver.

It is another objective of the claimed invention to provide a method for performing loop unrolled decision feedback equalization in an electronic device, and an associated apparatus, in order to adaptively adjust equalization information input into comparators within a receiver such as a DFE receiver with aid of voltage feedforward.

According to at least one preferred embodiment, a method for performing loop unrolled decision feedback equalization in an electronic device is provided, where the method comprises the steps of: receiving a tap control signal and an offset control signal from a digital domain of a DFE receiver in the electronic device, and generating DFE information respectively corresponding to the tap control signal and the offset control signal in an analog domain of the DFE receiver; broadcasting the DFE information respectively corresponding to the tap control signal and the offset control signal toward a plurality of comparators in the DFE receiver; utilizing the plurality of comparators to perform comparison operations according to the DFE information respectively corresponding to the tap control signal and the offset control signal to generate a plurality of comparison results; and selectively adjusting the tap control signal and the offset control signal according to the plurality of comparison results, in order to control (more particularly, optimize) the DFE information respectively corresponding to the tap control signal and the offset control signal, respectively.

According to at least one preferred embodiment, an apparatus for performing loop unrolled decision feedback equalization in an electronic device is provided, where the apparatus comprises at least one portion of the electronic device. The apparatus may comprise information broadcasting and calculation circuit and a controller that is coupled to the information broadcasting and calculation circuit. The information broadcasting and calculation circuit is arranged for receiving a tap control signal and an offset control signal from a digital domain of a DFE receiver in the electronic device and generating DFE information respectively corresponding to the tap control signal and the offset control signal in an analog domain of the DFE receiver, broadcasting the DFE information respectively corresponding to the tap control signal and the offset control signal toward a plurality of comparators in the DFE receiver, and utilizing the plurality of comparators to perform comparison operations according to the DFE information respectively corresponding to the tap control signal and the offset control signal to generate a plurality of comparison results. In addition, the controller is arranged for selectively adjusting the tap control signal and the offset control signal according to the plurality of comparison results, in order to control (more particularly, optimize) the DFE information respectively corresponding to the tap control signal and the offset control signal, respectively.

It is an advantage of the present invention that the present invention method and the associated apparatus can enhance the overall performance of a system comprising the electronic device. In addition, the present invention method and the associated apparatus can automatically adjust equalization information input into comparators within a receiver such as a DFE receiver. As a result, the related art problems (e.g. the problem of erroneously reproducing data when receiving a signal, and the problem of failing to recover data in a situation where heavy ISI is encountered) can be resolved. Additionally, the present invention method and the associated apparatus can adaptively adjust equalization information input into comparators within a receiver such as a DFE receiver with aid of voltage feedforward, and therefore can precisely track the waveforms of the received signal of the DFE receiver and correctly recover the data.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
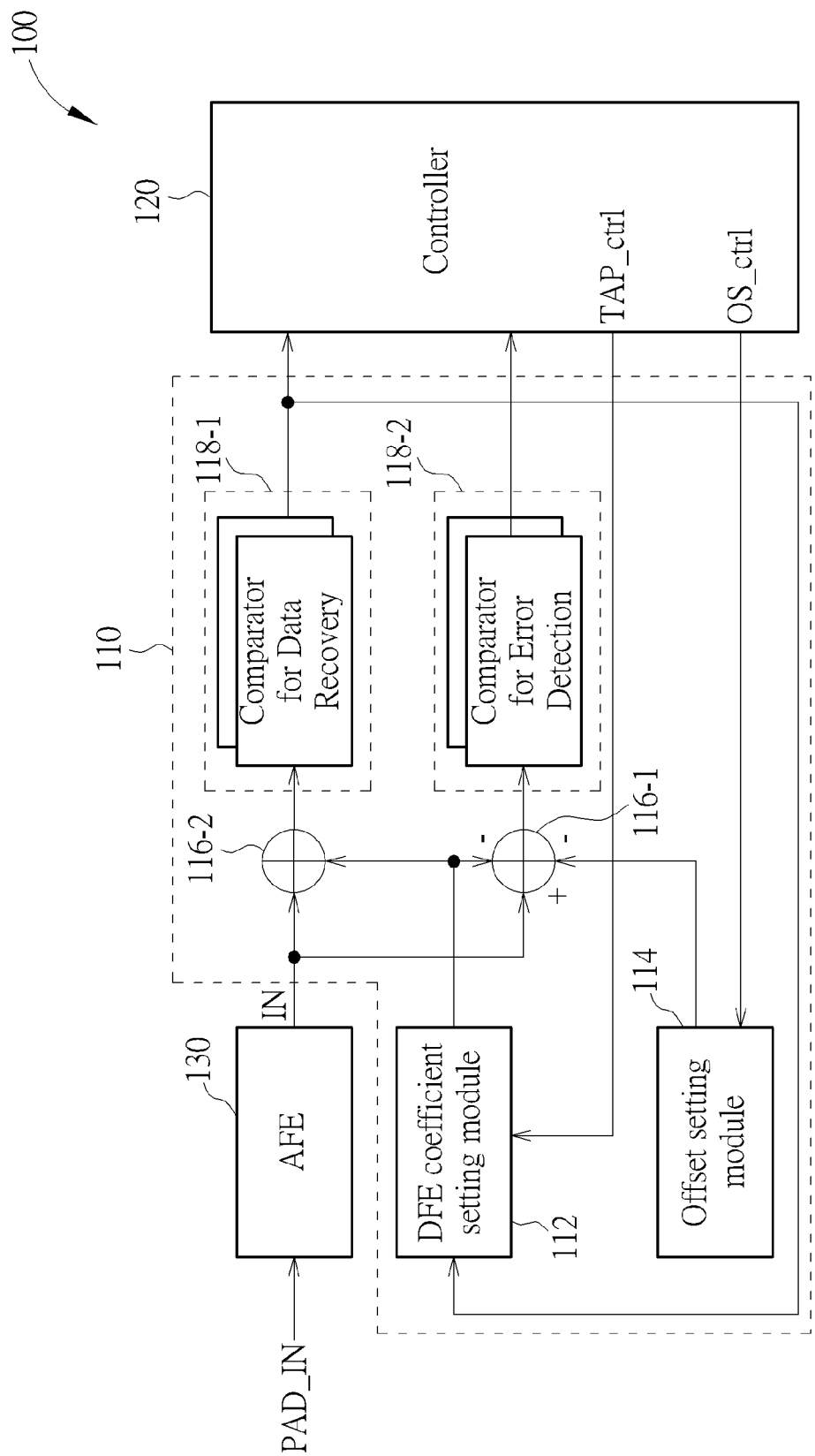
FIG. 1 is a diagram of an apparatus for performing loop unrolled decision feedback equalization (DFE) in an electronic device according to a first embodiment of the present invention.

FIG. 1 is a diagram of an apparatus 100 for performing loop unrolled decision feedback equalization (DFE) in an electronic device according to a first embodiment of the present invention, where the apparatus 100 may comprise at least one portion of the electronic device. For example, the apparatus 100 may comprise a portion of the electronic device mentioned above, and more particularly, can be at least one hardware circuit such as at least one integrated circuit (IC) within the electronic device and associated circuits thereof. In another example, the apparatus 100 can be the whole of the electronic device mentioned above. In another example, the apparatus 100 may comprise a system comprising the electronic device mentioned above (e.g. a wireless communications system comprising the electronic device). Examples of the electronic device may include, but not limited to, a mobile phone, a tablet, and a laptop computer.

As shown in FIG. 1, the apparatus 100 may comprise an information broadcasting and calculation circuit 110 and a controller 120, where an information broadcasting module within the information broadcasting and calculation circuit 110 may comprise a plurality of digital-to-analog converters (DACs) and associated broadcasting wirings. For example, the information broadcasting and calculation circuit 110 may comprise a DFE coefficient setting module 112, an offset setting module 114, a plurality of arithmetic calculation modules such as two arithmetic calculation modules 116-1 and 116-2, and a plurality of comparators such as two sets of comparators 118-1 and 118-2 (respectively labeled "Comparator for Data Recovery" and "Comparator for Error Detection" in FIG. 1, for better comprehension), in which the set of comparators 118-1 may be utilized for performing data recovery and the set of comparators 118-2 may be utilized for performing error detection. The plurality of DACs and the associated broadcasting wirings of the information broadcasting module mentioned above may be implemented with some modules (or some components) and some wirings within the information broadcasting and calculation circuit 110. More particularly, in a situation where this information broadcasting module is arranged for broadcasting DFE information toward the plurality of comparators, the information broadcasting module may comprise the DFE coefficient setting module 112, the offset setting module 114, and the plurality of arithmetic calculation modules such as the two arithmetic calculation modules 116-1 and 116-2. In addition, the apparatus 100 may further comprise an analog front end (AFE) circuit 130. For example, the components of the architecture shown in FIG. 1 may be positioned within a receiver such as a DFE receiver in the electronic device, and the AFE circuit 130 may be regarded as the AFE circuit of the DFE receiver, for receiving an input signal of the DFE receiver.

According to this embodiment, the AFE circuit 130 may receive a pad input signal PAD_IN, which can be taken as an example of the input signal of the DFE receiver, and may perform front end processing on the pad input signal PAD_IN to generate a corresponding input signal IN, and may further input the corresponding input signal IN into the information broadcasting and calculation circuit 110. In addition, the information broadcasting and calculation circuit 110 may utilize the DFE coefficient setting module 112 and the offset setting module 114 to set a plurality of DFE coefficients of the DFE receiver and an offset of the DFE receiver, respectively, and may utilize the plurality of comparators to generate a plurality of comparison results, where the plurality of comparison results and/or some derivatives of the plurality of comparison results may be input into the controller 120. For example, the DFE coefficient setting module 112 may set the DFE coefficients with a predetermined initial value of these DFE coefficients, and the offset setting module 114 may set the offset with a predetermined initial value of the offset. Additionally, the controller 120 may determine whether to adjust these DFE coefficients and determine whether to adjust the offset according to at least one portion of the outputs of the information broadcasting and calculation circuit 110, such as the plurality of comparison results and/or the derivatives of the plurality of comparison results. More particularly, by setting (or by changing) the tap control signal TAP_ctrl and the offset control signal OS_ctrl, the controller 120 may selectively adjust the DFE coefficients and selectively adjust the offset at any time when needed. As a result, the DFE coefficients and the offset may be adjusted iteratively.

Based upon the architecture shown in FIG. 1, the apparatus 100 can adaptively adjust equalization information, such as the DFE coefficients and the offset that are applied to (or indirectly input into) the plurality of comparators positioned in the receiver (e.g. the DFE receiver), with aid of voltage feedforward. Therefore, the apparatus 100 can precisely track the waveforms of the received signal of the DFE receiver (e.g. the pad input signal PAD_IN) and correctly recover the data carried by the received signal.

Figure 2:
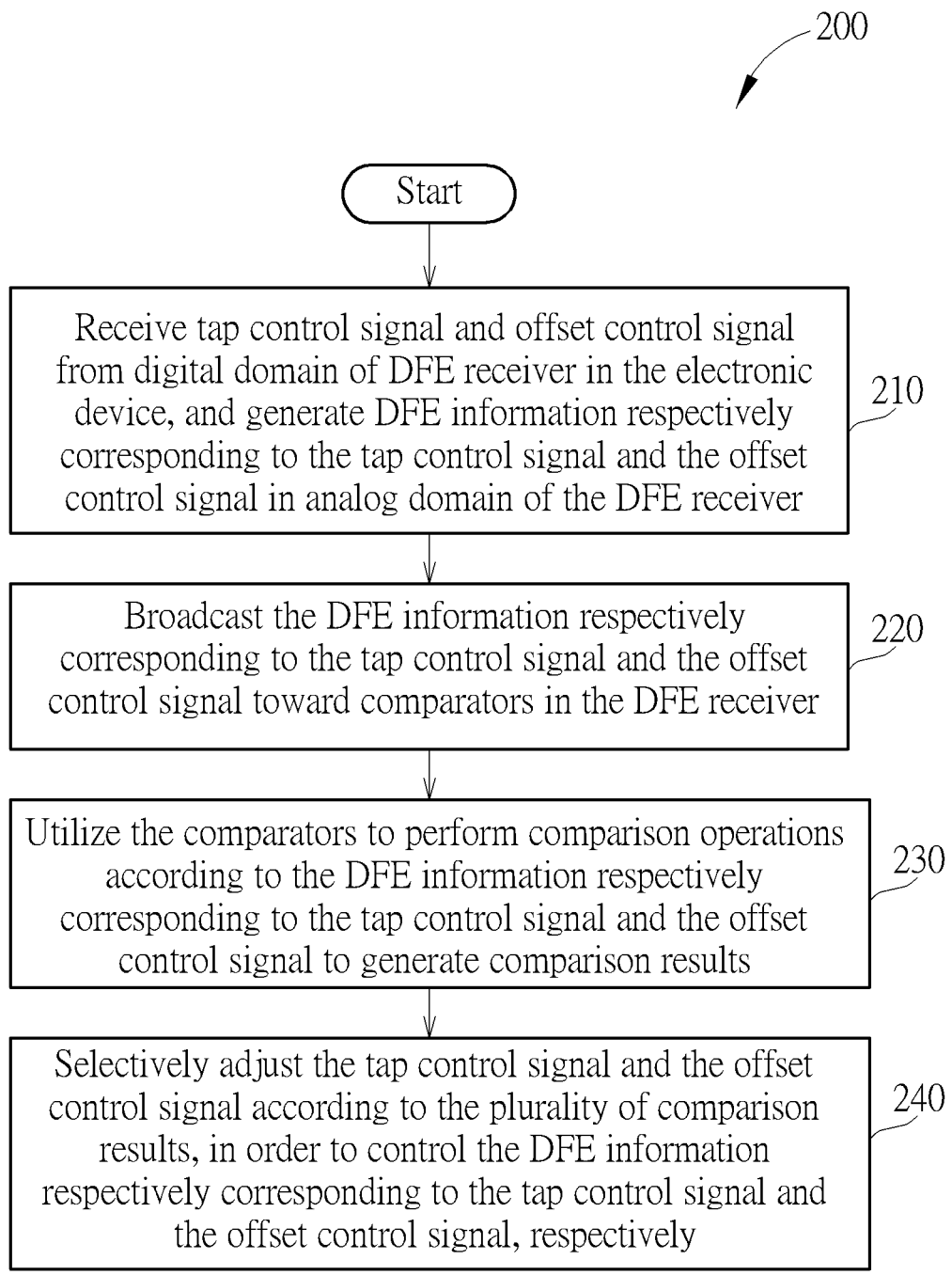
FIG. 2 illustrates a flowchart of a method for performing loop unrolled DFE in an electronic device according to an embodiment of the present invention.

FIG. 2 illustrates a flowchart of a method 200 for performing loop unrolled DFE in an electronic device according to an embodiment of the present invention. The method 200 shown in FIG. 2 can be applied to the apparatus 100 shown in FIG. 1, and can be applied to the information broadcasting circuit 110 and the controller 120 thereof. The method can be described as follows.

In Step 210, the information broadcasting and calculation circuit 110 (more particularly, the information broadcasting module thereof) may receive the tap control signal TAP_ctrl and the offset control signal OS_ctrl from a digital domain of the DFE receiver in the electronic device, and generate DFE information respectively corresponding to the tap control signal TAP_ctrl and the offset control signal OS_ctrl in an analog domain of the DFE receiver. For example, the DFE information corresponding to the tap control signal TAP_ctrl may comprise the DFE coefficients, and the DFE information corresponding to the offset control signal OS_ctrl may comprise the offset. According to this embodiment, the tap control signal TAP_ctrl and the offset control signal OS_ctrl may be generated by the controller 120 in the digital domain of the DFE receiver, and the information broadcasting and calculation circuit 110 is positioned in the analog domain of the DFE receiver.

In Step 220, the information broadcasting and calculation circuit 110 (more particularly, the information broadcasting module thereof) may broadcast the DFE information respectively corresponding to the tap control signal TAP_ctrl and the offset control signal OS_ctrl toward the plurality of comparators in the DFE receiver, such as the two sets of comparators 118-1 and 118-2 in the DFE receiver. For example, in a situation where the DFE information corresponding to the tap control signal TAP_ctrl comprises the DFE coefficients and the DFE information corresponding to the offset control signal OS_ctrl comprises the offset, the apparatus 100 may utilize the information broadcasting and calculation circuit 110 (more particularly, the information broadcasting module thereof) to broadcast the DFE coefficients toward at least one set (e.g. one or more sets) within the two sets of comparators 118-1 and 118-2 and broadcast the offset toward at least one set (e.g. one or more sets) within the two sets of comparators 118-1 and 118-2.

In Step 230, the information broadcasting and calculation circuit 110 (more particularly, the two sets of comparators 118-1 and 118-2) may perform comparison operations according to the DFE information respectively corresponding to the tap control signal TAP_ctrl and the offset control signal OS_ctrl, to generate multiple comparison results such as the plurality of comparison results.

In Step 240, the controller 120 may selectively adjust the tap control signal TAP_ctrl and the offset control signal OS_ctrl according to the comparison results mentioned in Step 230, such as the plurality of comparison results, in order to control (more particularly, optimize) the DFE information respectively corresponding to the tap control signal TAP_ctrl and the offset control signal OS_ctrl (e.g. the DFE coefficients and the offset), respectively. For example, the controller 120 may selectively adjust the tap control signal TAP_ctrl and the offset control signal OS_ctrl according to the plurality of comparison results and/or the derivatives of the plurality of comparison results, in order to control (more particularly, optimize) the DFE information respectively corresponding to the tap control signal TAP_ctrl and the offset control signal OS_ctrl (e.g. the DFE coefficients and the offset), respectively.

Please note that the operation of Step 210, the operation of Step 220, the operation of Step 230, and the operation of Step 240 are illustrated in FIG. 2, respectively. This is for illustrative purposes only, and is not meant to be a limitation of the present invention. According to some variations of this embodiment, at least one portion of the operation of Step 210, at least one portion of the operation of Step 220, at least one portion of the operation of Step 230, and/or at least one portion (e.g. a portion or all) of the operation of Step 240 can be performed at the same time.

Based upon the working flow of the method 200, the apparatus 100 (more particularly, the controller 120) may control (more particularly, optimize) the DFE information respectively corresponding to the tap control signal TAP_ctrl and the offset control signal OS_ctrl (e.g. the DFE coefficients and the offset) by adjusting the tap control signal TAP_ctrl and the offset control signal OS_ctrl according to the comparison results mentioned in Step 230 (e.g. the plurality of comparison results) in an online manner, respectively. For example, the initial states of the tap control signal TAP_ctrl and the offset control signal OS_ctrl may be set arbitrarily, and the controller 120 may adaptively adjust the DFE information respectively corresponding to the tap control signal TAP_ctrl and the offset control signal OS_ctrl (e.g. the DFE coefficients and the offset) in response to the variations of characteristics of the input signal of the DFE receiver (e.g. the variations of the swings corresponding to some data pattern carried by this input signal, and/or the variations of the voltage level range of this input signal), since the controller 120 may selectively adjust the tap control signal TAP_ctrl and the offset control signal OS_ctrl according to the comparison results mentioned in Step 230 when needed.

According to this embodiment, the apparatus 100 may utilize the DFE coefficient setting module 112 to set the plurality of DFE coefficients with a predetermined initial value of these DFE coefficients, and may utilize the offset setting module 114 to set the offset with a predetermined initial value of the offset. More particularly, by setting (or by changing) the tap control signal TAP_ctrl, the controller 120 may selectively adjust the plurality of DFE coefficients through the DFE coefficient setting module 112 at any time when needed. By setting (or by changing) the offset control signal OS_ctrl, the controller 120 may selectively adjust the offset through the offset setting module 114 at any time when needed. As a result, the DFE coefficients and the offset may be optimized.

Figure 3:
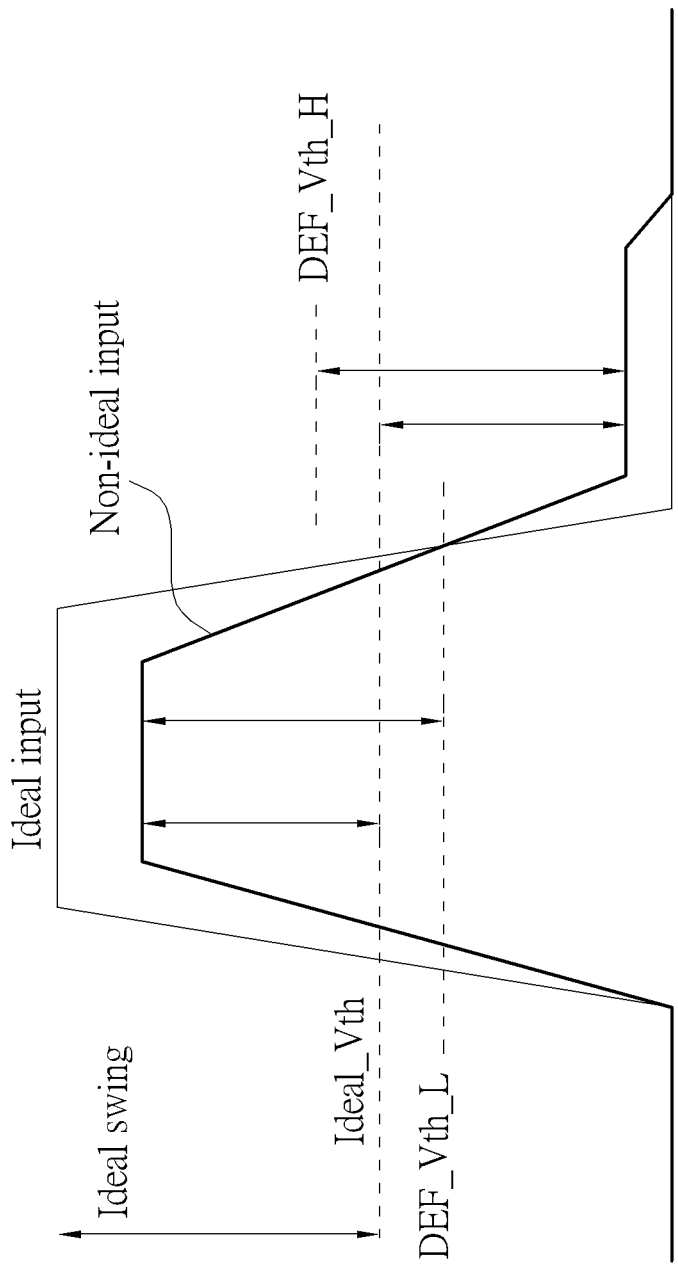
FIG. 3 illustrates an unrolled DFE control scheme involved with the method shown in FIG. 2 according to an embodiment of the present invention.

FIG. 3 illustrates an unrolled DFE control scheme involved with the method 200 shown in FIG. 2 according to an embodiment of the present invention. The unrolled DFE control scheme is directed to implementing the apparatus 100 by considering $1^{st}$ Tap unrolled DFE as shown in FIG. 3. For example, a previous bit such as the logical value of 0 may be sent through the channel, and the next bit such as the logical value of 1 would be impacted by the channel response, so the swing of the partial waveform corresponding to the next bit cannot reach the ideal swing. As a result, the waveform corresponding to the ideal input may be varied and may become the waveform corresponding to the non-ideal input, and therefore the ideal voltage threshold Ideal_Vth for the ideal input may be not suitable for the non-ideal input. By applying the unrolled DFE control scheme, the apparatus 100 may utilize the DFE voltage thresholds DFE_Vth_L and DFE_Vth_H for the non-ideal input. For example, the apparatus 100 may selectively change the DFE voltage thresholds DFE_Vth_L and/or DFE_Vth_H based on previous data. A digital code such as that carried by the tap control signal TAP_ctrl or that carried by the offset control signal OS_ctrl may be sent toward an analog DAC such as one of the DACs mentioned above, so the information may be transferred, through the associated wirings mentioned above, toward every comparator of the aforementioned comparators that requires DFE (more particularly, requires the DFE information to be applied to this comparator) to cancel the ISI effect. As a result, the signal strength related to a specific threshold voltage may be enhanced during such a process.

Figure 4:
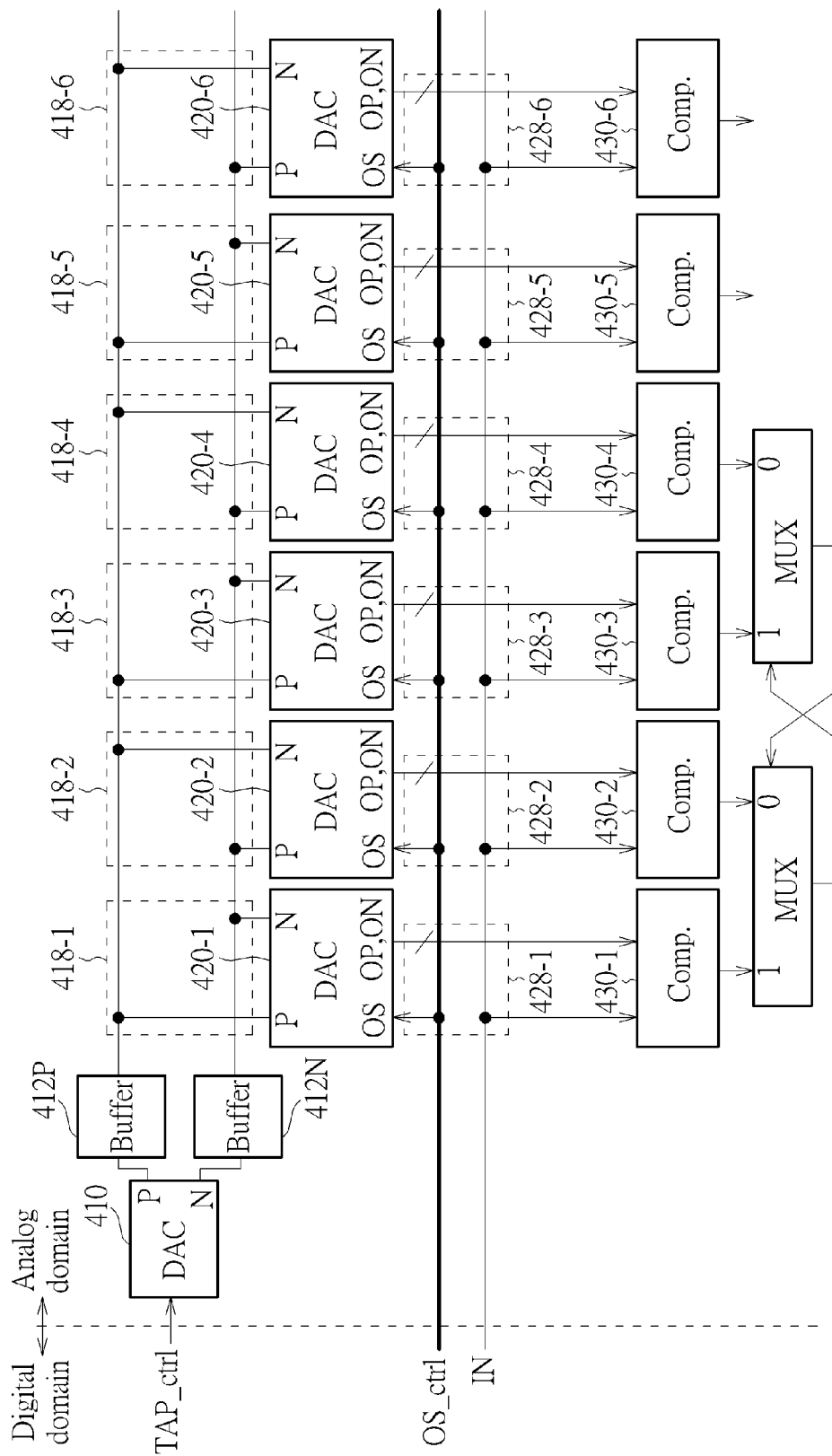
FIG. 4 illustrates a half-rate unrolled 1st tap DFE architecture involved with the method shown in FIG. 2 according to an embodiment of the present invention.

FIG. 4 illustrates a half-rate unrolled 1st tap DFE architecture involved with the method 200 shown in FIG. 2 according to an embodiment of the present invention, where the half-rate unrolled 1st tap DFE architecture shown in FIG. 4 can be taken as an example of at least one portion of the apparatus 100 shown in FIG. 1. For example, the DACs 410, 420-1, 420-2, 420-3, 420-4, 420-5, and 420-6 can be taken as an example of the plurality of DACs mentioned above, the comparators 430-1, 430-2, 430-3, and 430-4 (labeled "Comp." in FIG. 4, for brevity) can be taken as an example of the set of comparators 118-1 for data recovery, and the comparators 430-5 and 430-6 (labeled "Comp." in FIG. 4, for brevity) can be taken as an example of the set of comparators 118-2 for error detection. In another example, a set of broadcasting wirings 418-1, 418-2, 418-3, 418-4, 418-5, and 418-6 between the buffers 412P and 412N and the DACs 420-1, 420-2, 420-3, 420-4, 420-5, and 420-6 can be taken as an example of the associated broadcasting wirings mentioned above, while another set of broadcasting wirings 428-1, 428-2, 428-3, 428-4, 428-5, and 428-6 between the DACs 420-1, 420-2, 420-3, 420-4, 420-5, and 420-6 and the comparators 430-1, 430-2, 430-3, 430-4, 430-5, and 430-6 can be taken as another example of the associated broadcasting wirings mentioned above. As shown in FIG. 4, the half-rate unrolled 1st tap DFE architecture may further comprise some multiplexers (labeled "MUX" in FIG. 4, for brevity).

According to this embodiment, the apparatus 100 may utilize a DAC 410 to perform digital-to-analog conversion on the tap control signal TAP_ctrl to generate analog outputs at the two DAC output terminals P and N of this DAC 410, respectively. The buffers 412P and 412N are coupled to the two DAC output terminals P and N, respectively, and are arranged for buffering the analog outputs output from the two DAC output terminals P and N of the DAC 410. By utilizing the set of broadcasting wirings 418-1, 418-2, 418-3, 418-4, 418-5, and 418-6, the information broadcasting and calculation circuit 110 may broadcast the DFE coefficients toward the comparators 430-1, 430-2, 430-3, 430-4, 430-5 and 430-6. For example, the information broadcasting and calculation circuit 110 may perform voltage summation by applying the DFE coefficients, i.e. the DFE coefficients represented by the analog outputs output from the two DAC output terminals P and N, to two voltage reference terminals {VH, VL} (e.g. the high voltage reference terminal VH arranged for inputting a high voltage level reference, and the low voltage reference terminal VL arranged for inputting a low voltage level reference) of each DAC of the DACs 420-1, 420-2, 420-3, 420-4, 420-5, and 420-6 through a broadcasting wiring of the set of broadcasting wirings 418-1, 418-2, 418-3, 418-4, 418-5, and 418-6, respectively. In addition, by utilizing the other set of broadcasting wirings 428-1, 428-2, 428-3, 428-4, 428-5, and 428-6, the information broadcasting and calculation circuit 110 may broadcast the offset toward the comparators 430-1, 430-2, 430-3, 430-4, 430-5 and 430-6. For example, the information broadcasting and calculation circuit 110 may perform current summation by applying the offset represented by the offset control signal OS_ctrl to another voltage reference terminal VS of the aforementioned each DAC of the DACs 420-1, 420-2, 420-3, 420-4, 420-5, and 420-6 through a broadcasting wiring of the other set of broadcasting wirings 428-1, 428-2, 428-3, 428-4, 428-5, and 428-6. As a result of utilizing the half-rate unrolled 1st tap DFE architecture shown in FIG. 4, the information broadcasting and calculation circuit 110 may broadcast the DFE information respectively corresponding to the tap control signal TAP_ctrl and the offset control signal OS_ctrl toward the two sets of comparators 118-1 and 118-2 such as the comparators {430-1, 430-2, 430-3, 430-4} and {430-5, 430-6}, respectively, where a mathematical expression of the comparison results of the comparators {430-1, 430-2, 430-3, 430-4, 430-5, 430-6} (or the derivatives thereof) may be expressed as follows:

$$(IN-OS\_ctrl-TAP\_ctrl>0?)$$

where the notations "IN", "OS_ctrl", and "TAP_ctrl" in the above mathematical expression that correspond to the input signal IN, the tap control signal TAP_ctrl, and the offset control signal OS_ctrl may represent the values carried by the input signal IN, the tap control signal TAP_ctrl, and the offset control signal OS_ctrl, respectively.

Figure 5:
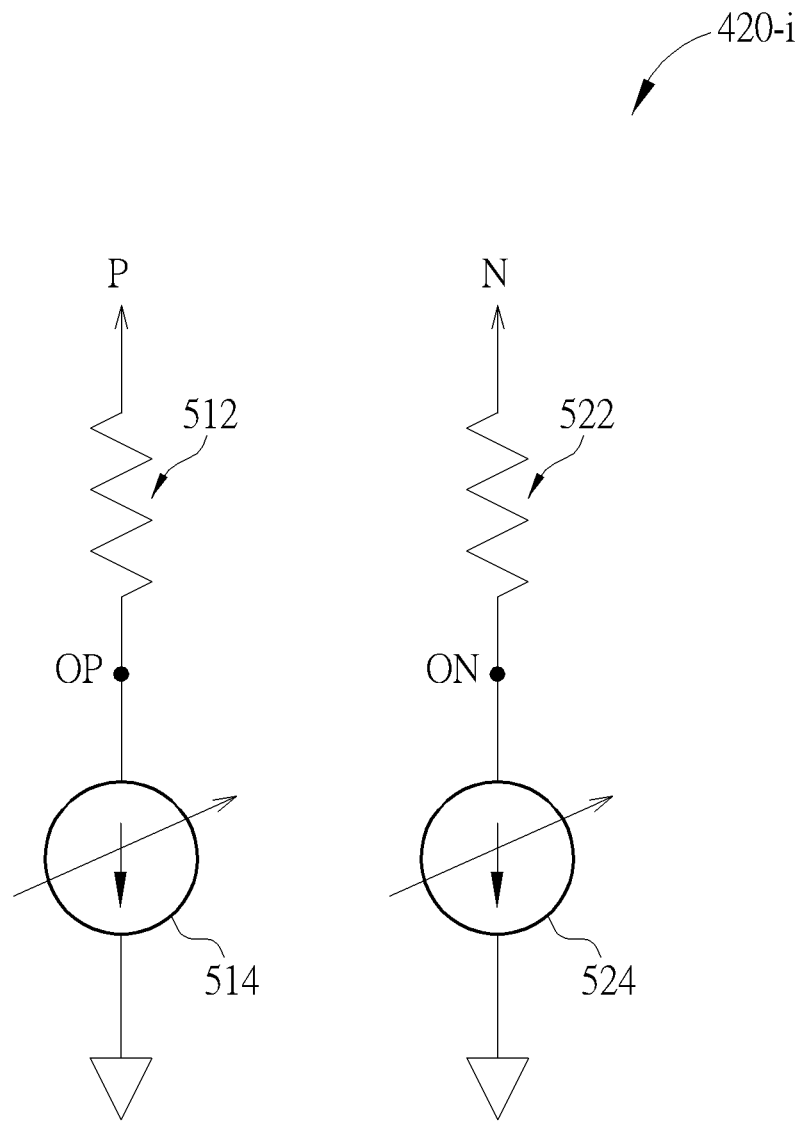
FIG. 5 illustrates some components within a digital-to-analog converter (DAC) within some of the DACs shown in FIG. 4 according to an embodiment of the present invention.

FIG. 5 illustrates some components within a DAC within some of the DACs shown in FIG. 4 according to an embodiment of the present invention. For example, each DAC of a portion of the plurality of DACs, such as any DAC 420-$i$ within the DACs 420-1, 420-2, 420-3, 420-4, 420-5, and 420-6 shown in FIG. 4 (e.g. the index $i$ may be a positive integer that falls within the range of the interval [1, 6] in some embodiments), may comprise a first resistor 512 having a first terminal coupled to the high voltage reference terminal VH of this DAC 420-$i$, a first variable current source 514 coupled between a second terminal of the first resistor 512 and one ground terminal within at least one ground terminal (e.g. one or more ground terminals) of this DAC 420-$i$, a second resistor 522 having a first terminal coupled to the low voltage reference terminal VL of this DAC 420-$i$, and a second variable current source 524 coupled between a second terminal of the second resistor 522 and one ground terminal within the aforementioned at least one ground terminal of this DAC 420-$i$. Please note that a terminal between the first resistor 512 and the first variable current source 514 (e.g. the upper terminal of the first variable current source 514 shown in FIG. 5) is the output terminal of the first variable current source 512, and can be utilized as the output terminal OP of this DAC 420-$i$. In addition, a terminal between the second resistor 522 and the second variable current source 524 (e.g. the upper terminal of the second variable current source 524 shown in FIG. 5) is the output terminal of the second variable current source 522, and can be utilized as the output terminal ON of this DAC 420-$i$.

According to this embodiment, a current control terminal of each current source within the first variable current source 514 and the second variable current source 524 may be coupled to the voltage reference terminal VS of this DAC 420-$i$ and may be controlled by the offset control signal OS_ctrl. As a result, this DAC 420-$i$ may control the offset according to the offset control signal OS_ctrl with aid of the first variable current source 514 and the second variable current source 524, and more particularly may adjust the offset compensation amount applied to the input signal IN through the next stage (i.e. the corresponding comparator 430-$i$ within the comparators {430-1, 430-2, 430-3, 430-4, 430-5, 430-6}). In addition, each voltage reference terminal within the two voltage reference terminals {VH, VL} may be controlled by the tap control signal TAP_ctrl through the upper half of the architecture shown in FIG. 4. As a result, this DAC 420-$i$ may control the tap coefficients, and more particularly may adjust the voltage threshold used for comparing the input signal IN through the next stage (i.e. the corresponding comparator 430-*i* within the comparators {430-1, 430-2, 430-3, 430-4, 430-5, 430-6}).

In this embodiment, the DAC 420-*i* may take the broadcasted information as common information. This is for illustrative purposes only, and is not meant to be a limitation of the present invention. According to some embodiments of the present invention, each sampler may have their own offset as well, so the DAC 420-*i* of these embodiments may also adjusts its level based on one or more dedicated comparator offset levels. This is for illustrative purposes only, and is not meant to be a limitation of the present invention.

Figure 6:
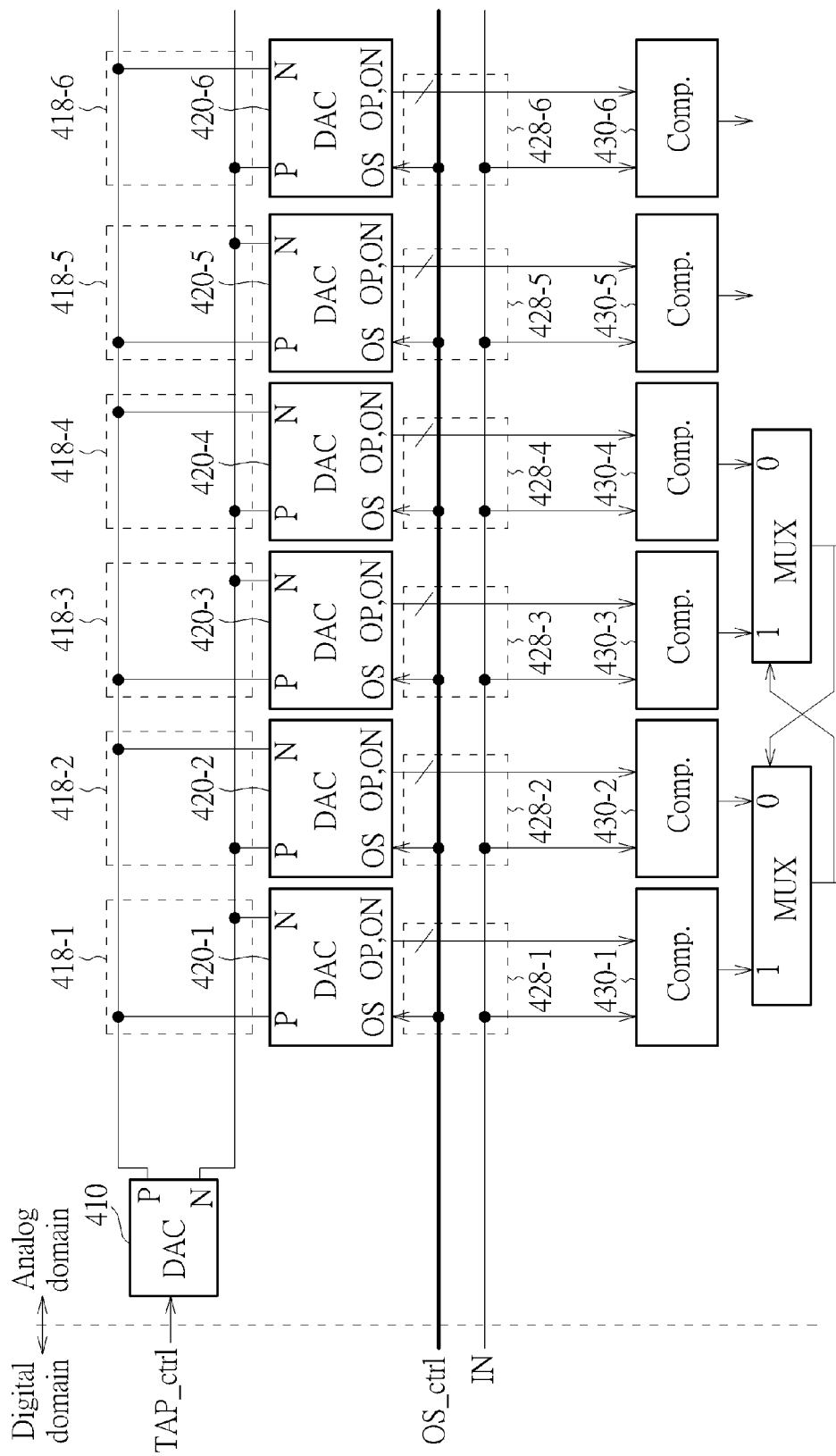
FIG. 6 illustrates a half-rate unrolled 1st tap DFE architecture involved with the method shown in FIG. 2 according to another embodiment of the present invention.

FIG. 6 illustrates a half-rate unrolled 1st tap DFE architecture involved with the method 200 shown in FIG. 2 according to another embodiment of the present invention, where the half-rate unrolled 1st tap DFE architecture shown in FIG. 6 can be taken as an example of at least one portion (e.g. a portion or all) of the apparatus 100 shown in FIG. 1. In comparison with the half-rate unrolled 1st tap DFE architecture shown in FIG. 4, it is unnecessary to implement the buffers 412P and 412N in this embodiment. For brevity, similar descriptions for this embodiment are not repeated in detail here.

Figure 7:
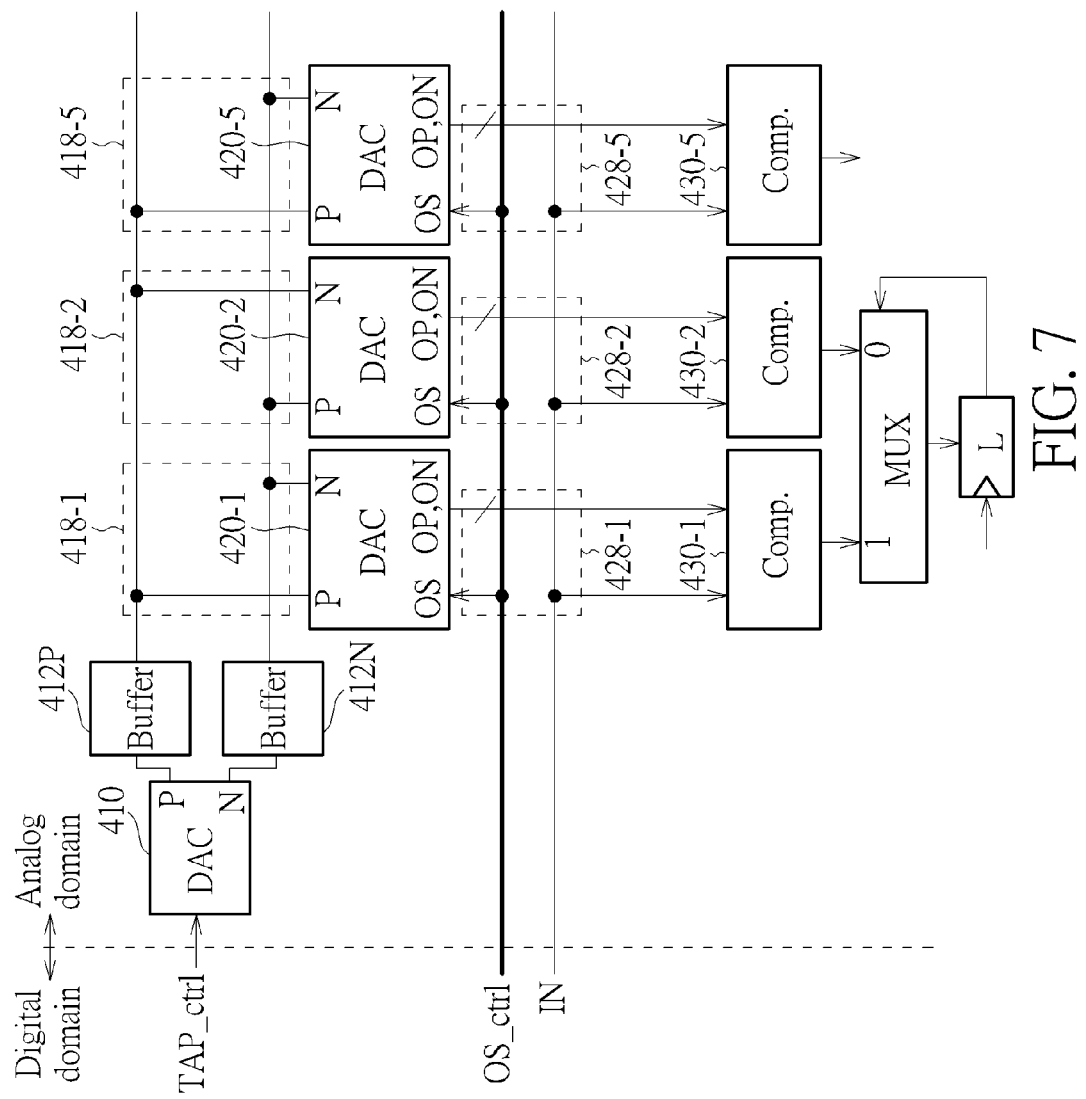
FIG. 7 illustrates a full-rate unrolled 1st tap DFE architecture involved with the method shown in FIG. 2 according to another embodiment of the present invention.

FIG. 7 illustrates a full-rate unrolled 1st tap DFE architecture involved with the method 200 shown in FIG. 2 according to another embodiment of the present invention, where the full-rate unrolled 1st tap DFE architecture shown in FIG. 7 can be taken as an example of at least one portion (e.g. a portion or all) of the apparatus 100 shown in FIG. 1. In comparison with the half-rate unrolled 1st tap DFE architecture shown in FIG. 4, it is unnecessary to implement, in the full-rate unrolled 1st tap DFE architecture of this embodiment, the broadcasting wirings 418-3, 418-4, and 418-6, the DACs 420-3, 420-4, and 420-6, the broadcasting wirings 428-3, 428-4, and 428-6, the comparators 430-3, 430-4, and 430-6, and the multiplexer corresponding to the comparators 430-3 and 430-4. In addition, the full-rate unrolled 1st tap DFE architecture of this embodiment may further comprise a latch (labeled "L" in FIG. 7, for brevity) coupled to the multiplexer corresponding to the comparators 430-1 and 430-2. As the detailed components and connections (or wirings) have been illustrated in FIG. 7, those skilled in the art may easily understand the implementation of full-rate unrolled 1st tap DFE architecture and the operations thereof based upon the descriptions of the above embodiments. Therefore, similar descriptions for this embodiment are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing loop unrolled decision feedback equalization (DFE) in an electronic device, the method comprising the steps of:
   receiving a tap control signal and an offset control signal from a digital domain of a DFE receiver in the electronic device, and generating DFE information respectively corresponding to the tap control signal and the offset control signal in an analog domain of the DFE receiver;
   broadcasting the DFE information respectively corresponding to the tap control signal and the offset control signal toward a plurality of comparators in the DFE receiver;
   utilizing the plurality of comparators to perform comparison operations according to the DFE information respectively corresponding to the tap control signal and the offset control signal to generate a plurality of comparison results; and
   selectively adjusting the tap control signal and the offset control signal according to the plurality of comparison results, in order to control the DFE information respectively corresponding to the tap control signal and the offset control signal, respectively;
   wherein the DFE information corresponding to the tap control signal comprises a plurality of DFE coefficients of the DFE receiver; and the DFE information corresponding to the offset control signal comprises an offset of the DFE receiver.

2. The method of claim 1, further comprising:
   utilizing a DFE coefficient setting circuit to set the plurality of DFE coefficients with a predetermined initial value of the plurality of DFE coefficients;
   wherein the step of selectively adjusting the tap control signal and the offset control signal according to the plurality of comparison results in order to control the DFE information respectively corresponding to the tap control signal and the offset control signal respectively further comprises:
   by changing the tap control signal, selectively adjusting the plurality of DFE coefficients through the DFE coefficient setting circuit.

3. The method of claim 1, further comprising:
   utilizing an offset setting circuit to set the offset with a predetermined initial value of the offset;
   wherein the step of selectively adjusting the tap control signal and the offset control signal according to the plurality of comparison results in order to control the DFE information respectively corresponding to the tap control signal and the offset control signal respectively further comprises:
   by changing the offset control signal, selectively adjusting the offset through the offset setting circuit.

4. The method of claim 1 wherein the step of broadcasting the DFE information respectively corresponding to the tap control signal and the offset control signal toward the plurality of comparators in the DFE receiver further comprises:
   utilizing a digital-to-analog converter (DAC) of a plurality of DACs to perform digital-to-analog conversion on the tap control signal to generate analog outputs of the DAC, and outputting the analog outputs from two DAC output terminals of the DAC, respectively, wherein the analog outputs represent the DFE coefficients;
   utilizing a set of broadcasting wirings to broadcast the DFE coefficients toward the plurality of comparators through other DACs of the plurality of DACs, respectively;
   utilizing another set of broadcasting wirings to broadcast the offset toward the plurality of comparators through the other DACs of the plurality of DACs, respectively; and
   utilizing the other DACs of the plurality of DACs to perform digital-to-analog conversion to generate the plurality of comparison results according to the DFE coefficients and the offset, respectively.

5. The method of claim 4, wherein the step of utilizing the set of broadcasting wirings to broadcast the DFE coefficients toward the plurality of comparators through the other DACs of the plurality of DACs respectively further comprises:

performing voltage summation by applying the DFE coefficients represented by the analog outputs to multiple voltage reference terminals of each DAC of the other DACs of the plurality of DACs through a broadcasting wiring of the set of broadcasting wirings, respectively.

6. The method of claim 4, wherein the step of utilizing the other set of broadcasting wirings to broadcast the offset toward the plurality of comparators through the other DACs of the plurality of DACs respectively further comprises:

performing current summation by applying the offset represented by the offset control signal to another voltage reference terminal of each DAC of the other DACs of the plurality of DACs through a broadcasting wiring of the other set of broadcasting wirings.

7. The method of claim 1, wherein the step of performing the comparison operations according to the DFE information respectively corresponding to the tap control signal and the offset control signal to generate the plurality of comparison results further comprises:

utilizing two sets of comparators within the plurality of comparators to perform the comparison operations according to the DFE information respectively corresponding to the tap control signal and the offset control signal to generate the plurality of comparison results, wherein one set of comparators within the two sets of comparators is utilized for performing data recovery, and another set of comparators within the two sets of comparators is utilized for performing error detection.

8. The method of claim 1, further comprising:

controlling the DFE information respectively corresponding to the tap control signal and the offset control signal by adaptively adjusting the tap control signal and the offset control signal according to the plurality of comparison results, respectively.

9. An apparatus for performing loop unrolled decision feedback equalization (DFE), the apparatus comprising at least one portion of an electronic device, the apparatus comprising:

an information broadcasting and calculation circuit, arranged for receiving a tap control signal and an offset control signal from a digital domain of a DFE receiver in the electronic device and generating DFE information respectively corresponding to the tap control signal and the offset control signal in an analog domain of the DFE receiver, broadcasting the DFE information respectively corresponding to the tap control signal and the offset control signal toward a plurality of comparators in the DFE receiver, and utilizing the plurality of comparators to perform comparison operations according to the DFE information respectively corresponding to the tap control signal and the offset control signal to generate a plurality of comparison results; and a controller, coupled to the information broadcasting and calculation circuit, arranged for selectively adjusting the tap control signal and the offset control signal according to the plurality of comparison results, in order to control the DFE information respectively corresponding to the tap control signal and the offset control signal, respectively;

wherein the DFE information corresponding to the tap control signal comprises a plurality of DFE coefficients of the DFE receiver; and the DFE information corresponding to the offset control signal comprises an offset of the DFE receiver.

10. The apparatus of claim 9, wherein the information broadcasting and calculation circuit comprises:

a DFE coefficient setting circuit, arranged for setting the plurality of DFE coefficients with a predetermined initial value of the plurality of DFE coefficients, wherein by changing the tap control signal, the controller selectively adjusts the plurality of DFE coefficients through the DFE coefficient setting circuit.

11. The apparatus of claim 9, wherein the information broadcasting and calculation circuit comprises:

an offset setting circuit, arranged for setting the offset with a predetermined initial value of the offset, wherein by changing the offset control signal, the controller selectively adjusts the offset through the offset setting circuit.

12. The apparatus of claim 9, wherein the information broadcasting and calculation circuit comprises:

a plurality of digital-to-analog converters (DACs), wherein a DAC of the plurality of DACs is arranged for performing digital-to-analog conversion on the tap control signal to generate analog outputs of the DAC, and outputting the analog outputs from two DAC output terminals of the DAC, respectively, and the analog outputs represent the DFE coefficients;

a set of broadcasting wirings, arranged for broadcasting the DFE coefficients toward the plurality of comparators through other DACs of the plurality of DACs, respectively; and another set of broadcasting wirings, arranged for broadcasting the offset toward the plurality of comparators through the other DACs of the plurality of DACs, respectively;

wherein the other DACs of the plurality of DACs are arranged for performing digital-to-analog conversion to generate the plurality of comparison results according to the DFE coefficients and the offset, respectively.

13. The apparatus of claim 12, wherein the information broadcasting and calculation circuit performs voltage summation by applying the DFE coefficients represented by the analog outputs to multiple voltage reference terminals of each DAC of the other DACs of the plurality of DACs through a broadcasting wiring of the set of broadcasting wirings, respectively.

14. The apparatus of claim 12, wherein the information broadcasting and calculation circuit performs current summation by applying the offset represented by the offset control signal to another voltage reference terminal of each DAC of the other DACs of the plurality of DACs through a broadcasting wiring of the other set of broadcasting wirings.

15. The apparatus of claim 12, wherein each DAC of the other DACs of the plurality of DACs comprises:

a high voltage reference terminal, arranged for inputting a high voltage level reference;

a low voltage reference terminal, arranged for inputting a low voltage level reference;

at least one ground terminal;

a first resistor, having a first terminal coupled to the high voltage reference terminal;

a first variable current source, coupled between a second terminal of the first resistor and one ground terminal within the at least one ground terminal;

a second resistor, having a first terminal coupled to the low voltage reference terminal; and a second variable current source, coupled between a second terminal of the second resistor and one ground terminal within the at least one ground terminal;

wherein a terminal between the first resistor and the first variable current source is utilized as an output terminal of said each DAC of the other DACs of the plurality of DACs; and a terminal between the second resistor and the second variable current source is utilized as another output terminal of said each DAC of the other DACs of the plurality of DACs.

16. The apparatus of claim 9, wherein the information broadcasting and calculation circuit comprises:

two sets of comparators within the plurality of comparators, arranged for performing the comparison operations according to the DFE information respectively corresponding to the tap control signal and the offset control signal to generate the plurality of comparison results, wherein the two sets of comparators comprise:

a set of comparators, arranged for performing data recovery; and another set of comparators, arranged for performing error detection.

17. The apparatus of claim 9, wherein the controller controls the DFE information respectively corresponding to the tap control signal and the offset control signal by adaptively adjusting the tap control signal and the offset control signal according to the plurality of comparison results, respectively.

* * * * *